United States Patent
Aqvist

[11] Patent Number: 5,211,486
[45] Date of Patent: May 18, 1993

[54] CAGE FOR ROLLER BEARING
[75] Inventor: Peter Aqvist, Gothenburg, Sweden
[73] Assignee: AB SKF, Gothenburg, Sweden
[21] Appl. No.: 905,393
[22] Filed: Jun. 29, 1992
[30] Foreign Application Priority Data Jul. 30, 1991 [SE] Sweden .................. 9101995

[51] Int. Cl.$^5$ .......................................... F16C 33/46
[52] U.S. Cl. ................................ 384/560; 384/572
[58] Field of Search ............ 384/560, 572, 559, 568, 384/576, 569, 580

[56] References Cited
U.S. PATENT DOCUMENTS 4,280,743 7/1981 Fernlund ..................... 384/572
4,629,339 12/1986 Morinaga ..................... 384/576
4,684,268 8/1987 Sahlgren et al. ............ 384/572
4,929,098 5/1990 Takata et al. ................ 384/568

Primary Examiner—Lenard A. Footland
Attorney, Agent, or Firm—Burns, Doane, Swecker & Mathis

[57] ABSTRACT

The invention refers to a roller bearing (10) with curved race track and roller profiles, whereby the radius of curvature is substantially bigger than the biggest distance between the center axes of the race tracks and their envelope surfaces, and having a cage (15) for the rollers. Said cage (15) being designed thus that it permits required axial displacement of the rollers (16) at tilting of the race tracks (13,14) relative to each other.

8 Claims, 1 Drawing Sheet

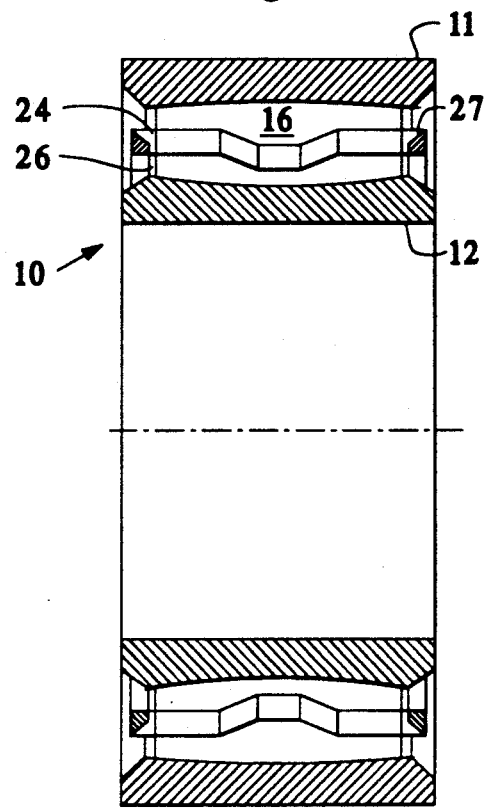
Fig. 1
Fig. 2
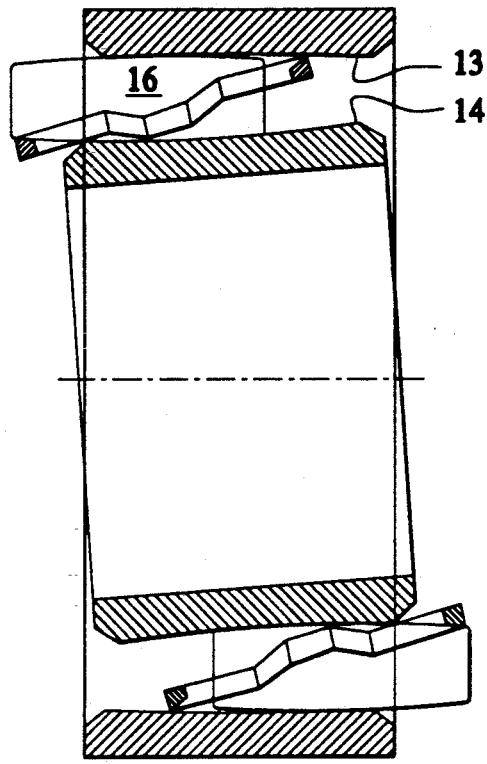
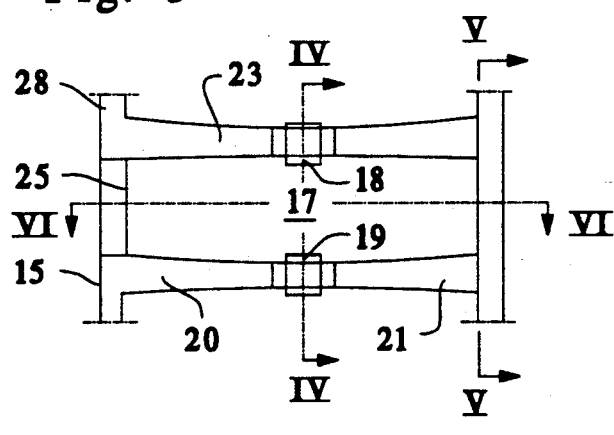
Fig. 3
Fig. 4
Fig. 5
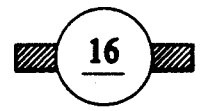
Fig. 6
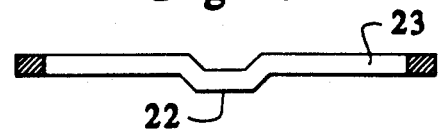

CAGE FOR ROLLER BEARING

The present ivention refers to a roller bearing incorporating an inner and an outer race track and a row of elongated rollers provided between the race tracks in contact with the race tracks and received in pockets in a cage, whereby the race tracks and the rollers have curved longitudinal section profiles, and wherein the rollers without hindrance of annular flanges at the race tracks are movable axially between the race tracks relative both of these for permitting a mutual angular tilting of the race tracks.

A bearing of this type is described in SE-B-449908. The bearing is therefore not further described but the contents of said publication is incorporated in this specification.

The purpose of the invention is to provide a bearing of this type equipped with a cage, which is centered by means of the rollers and which permits assembly and dismounting of the rollers after mutual angular tilting of the inner race ring and the outer race ring of the bearing.

This and other purposes of the invention are achieved in that it has been given the features defined in the accompanying claims.

The invention hereinafter will be further described with reference to the accompanying drawing in which is shown an embodiment of the invention for exemplifying reasons. This embodiment is intended only to illustrate the invention, which may be modified within the scope of the claims.

BRIEF DESCRIPTION OF THE DRAWINGS

In the drawing FIG. 1 shows an axial section through a bearing according to the invention and equipped with a cage.

FIG. 2 is a corresponding section with the cage in the position where assembly and dismounting of the rollers is permitted.

FIG. 3 is a fragmentary top view of the cage shown in FIG. 1 and 2.

FIG. 4 is a section along line IV—IV in FIG. 3.

FIG. 5 is a section along line V—V in FIG. 3.

FIG. 6 shows a section along line VI—VI in FIG. 3.

The bearing designated 10 has an inner race ring 12 and an outer race ring 11 provided with race tracks 13, 14 with concave profiles. Between the race tracks 13,14 are provided a row of rollers 16 having convex profiles. The rollers 16 are received in pockets 17 in a cage 15. As can be seen from FIG. 2 the rollers 16 are axially movable between the race tracks 13,14 relative to these in order to permit a relative angular adjustment of the race tracks 13,14 and thereby a relative angular adjustment of the inner race ring 2 and the outer race ring 11.

The cage 15 is provided with pockets 17, each one of which is intended to receive a roller 16. In accordance with the invention, the cage 15 is designed with opposed guiding surfaces 18,19 on lateral bars 23 in a pocket 17, which guiding surfaces are intended to cooperate with a roller 16 received in the pocket 17, at the axial middle portion of said roller 16. The guiding surfaces 18,19 are arranged on middle portions 22 of the cage 15, which middle portions are bent inwardly. The cage 15 thereby will be centered by means of the guiding surfaces 18,19 at the same time as the bars 23 have a guiding function and prevent two adjacent rollers 16 from contacting each other. The guiding surfaces are designed in appropriate manner for ascertaining the centering of the cage. At the embodiment shown the two opposed guiding surfaces 18,19 on a bar 23 converge in a direction radially outwards.

When the inner race ring 12 is tilted relative to the outer race ring 11 some rollers 16 are displaced axially, such as shown in FIG. 2. This condition is utilized at assembly and dismounting of the rollers 16. From FIG. 2 it is further seen that the cage 15 at said tilting will turn about the geometrical centre point. At said tilting the two axially opposed end portions 20,21 of the cage therefore will move radially relative to the rollers 16. The end portions 20,21 and the rollers 16 for this reason are designed in such a manner in accordance with the invention, that relative radial movement is permitted between the rollers 16 and the cage at said end portions. A cage designed in this manner according to the invention may be manufactured in a single piece, which is favourable both from economical and manufacturing points of view.

In order to ascertain a tilting of the cage 15 in relation to the roller 16 sufficient for assembly and dismounting of the roller 16, the cage and the rollers are mutually designed in such a manner that a sufficiently big axial clearance 24 between the opposite surfaces 25,26 of the cage and the roller is ascertained when the roller is axially centered. The ands of the roller could alternatively be curved. Such an embodiment will make possible a reduced axial cage clearance and thereby also an improved roller guidance.

In the embodiment illustrated the radially outer surface 27 of the side portions 28 of the cage is inclined in a direction axially and radially inwards. As shown in FIG. 2 such an embodiment makes it possible to assemble and dismount a roller 16 with maintaining of the biggest possible wall thickness of the side portion 28.

I claim:

1. Roller bearing comprising an inner an dan outer race track and a row of elongated rollers provided between the race tracks in contact with the race tracks and received in cage pockets in a cage, whereby the race tracks and the rollers have curved longitudinal section profiles, and wherein the rollers without hindrance of annular flanges at the race tracks are movable axially between the race tracks relative to both of the race tracks for permitting a mutual angular tilting of the race tracks, each cage pocket being designed with opposed guiding surfaces intended to cooperate with a roller contained in the cage pocket at the axial middle portion of the roller for centering the cage, the axial measure of the pocket being larger than the length of the roller so that there is axial clearance between opposed surfaces on the axial side edged of the pocket and the end surfaces of the roller when the roller is centered axially, and a space between axial bars bordering the cage pockets, at the two opposed end portions of the pocket being larger than the diameter of the roller, at the corresponding end portions of the roller, such that a relative radial movement is allowed between the roller and the cage at said end portions.

2. Roller bearing according to claim 1, wherein the middle portions of the axial bars of the cage, which cooperate with the middle portion of the roller, are bent inwardly.

3. Roller bearing according to claim 2, wherein the two guiding surfaces on the cage converge in a direction radially outwards.

4. Roller bearing according to claim 1, wherein the cage and a roller are designed in relation to each other, such that when the roller is axially centered, an axial clearance exists between opposed surfaces of the cage and the roller, said clearance being of a size sufficient for allowing required angular tilting of the cage relative to the roller for permitting assembly and dismounting of the roller.

5. Roller bearing according to claim 1, wherein the ends of the roller are curved in an axial section through the bearing, whereby a required angular tilting of the cage relative to the roller due to a small axial clearance between opposed surfaces of the cage and the roller, when the roller is centered axially, whereby the axial clearance is small enough to influence the guiding of the roller in the cage in a positive manner.

6. Roller bearing according to claim 4, wherein the radially outer surface of the cage on the side portions interconnecting the bars are inclined in a direction axially and radially inwards.

7. Roller bearing according to claim 1, wherein the cage is manufactured in a single piece.

8. Roller bearing according to claim 5, characterized therein, that the radially outer surface of the cage on the side portions interconnecting the bars are inclined in a direction axially and radially inwards.

* * * * *